United States Patent [19]
McConnell et al.

[11] Patent Number: 6,133,849
[45] Date of Patent: *Oct. 17, 2000

[54] CONTROL SIGNAL CODING AND DETECTION IN THE AUDIBLE AND INAUDIBLE RANGES

[75] Inventors: Peter Robert Henderson McConnell, Burnaby; Robert Allan Scragg, Vancouver, both of Canada

[73] Assignee: Unity Wireless Systems Corporation, Vancouver, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/603,413
[22] Filed: Feb. 20, 1996
[51] Int. Cl.$^7$ .................................................. H04Q 1/00
[52] U.S. Cl. ...................................... 340/825.72; 340/906
[58] Field of Search ...................... 340/825.72, 825.19, 340/906; 367/197

[56] References Cited

U.S. PATENT DOCUMENTS

| | | | |
|---|---|---|---|
| 2,355,607 | 8/1944 | Shepherd | 340/906 |
| 3,784,970 | 1/1974 | Simpkin | 340/906 |
| 3,881,169 | 4/1975 | Malach | 340/906 |
| 3,992,656 | 11/1976 | Joy | 340/906 |
| 4,602,357 | 7/1986 | Yang et al. | 367/93 |
| 4,806,931 | 2/1989 | Nelson | 340/906 |
| 4,857,921 | 8/1989 | McBride | 340/906 |
| 4,864,297 | 9/1989 | Shaw et al. | 340/906 |
| 4,914,434 | 4/1990 | Morgan | 340/906 |
| 5,014,052 | 5/1991 | Obeck | 340/906 |
| 5,172,113 | 12/1992 | Hamer | 340/906 |
| 5,677,684 | 10/1997 | McArthur | 340/906 |

FOREIGN PATENT DOCUMENTS

WO 95/24028   9/1995   WIPO .

*Primary Examiner*—Brian Zimmerman
*Attorney, Agent, or Firm*—Burns, Doane, Swecker & Mathis, L.L.P.

[57] ABSTRACT

A coded siren sound generator and a corresponding detector module are provided which allow uniquely coded tone patterns generated by the coded siren to be detected and processed such that only specific sirens will activate the detector module. In one embodiment, only a few codewords are sent by the transmitter. The receiver looks for the occurrence of one or more of these selected codewords and takes a predetermined action based on programming of the detector. The system may operate at audible or ultrasonic frequencies. In accordance with a further embodiment, audio (either audible or ultrasonic) "packets" are sent by the transmitter These packets contain sufficient information to uniquely identify the vehicle sending the packet and allow the vehicle to send commands and data to the detector. The commands and data may be for purposes such as requesting emergency pre-emption for a left turn at an intersection, requesting straight ahead pre-emption, etc.

10 Claims, 7 Drawing Sheets

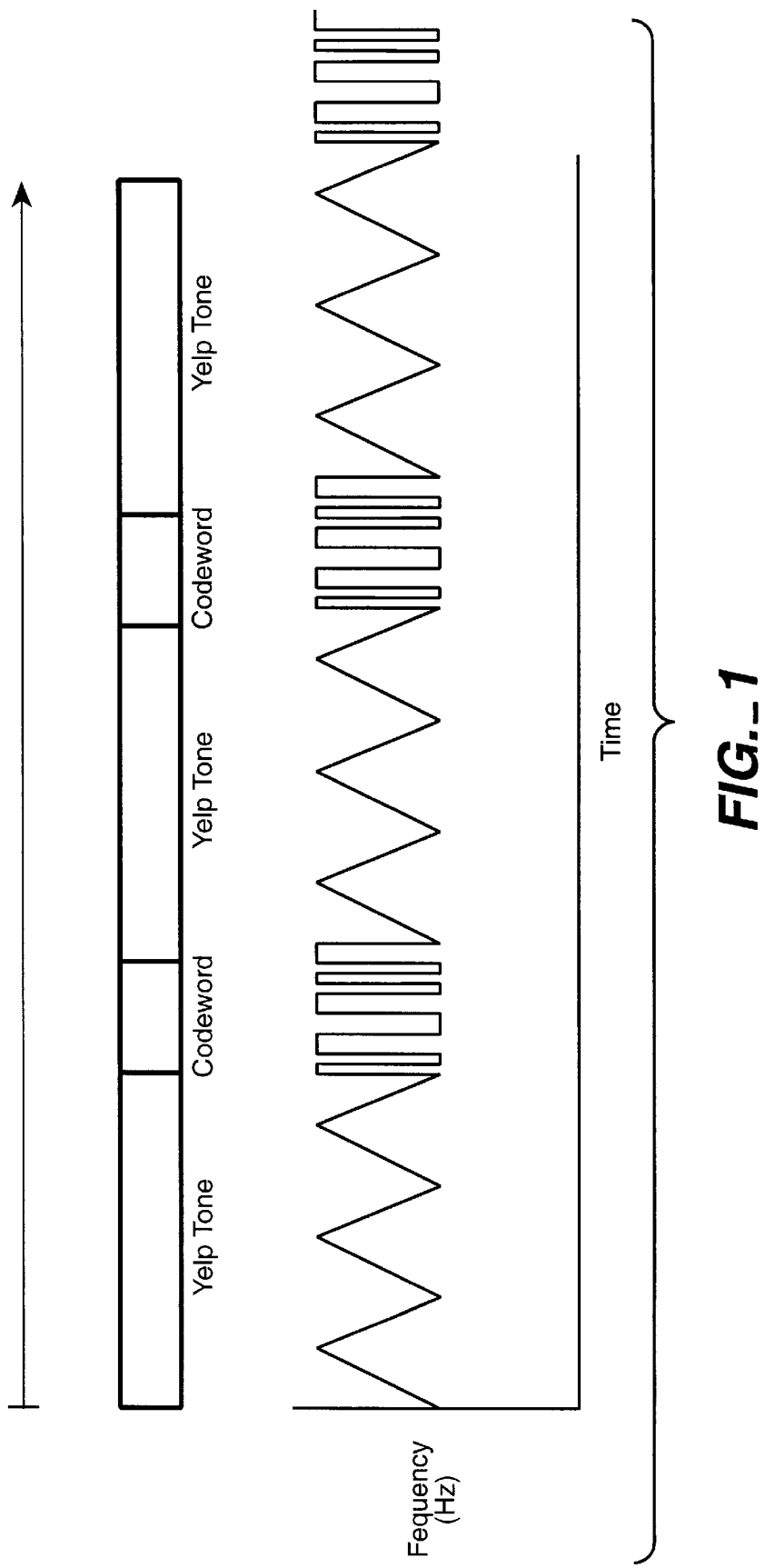
FIG._1

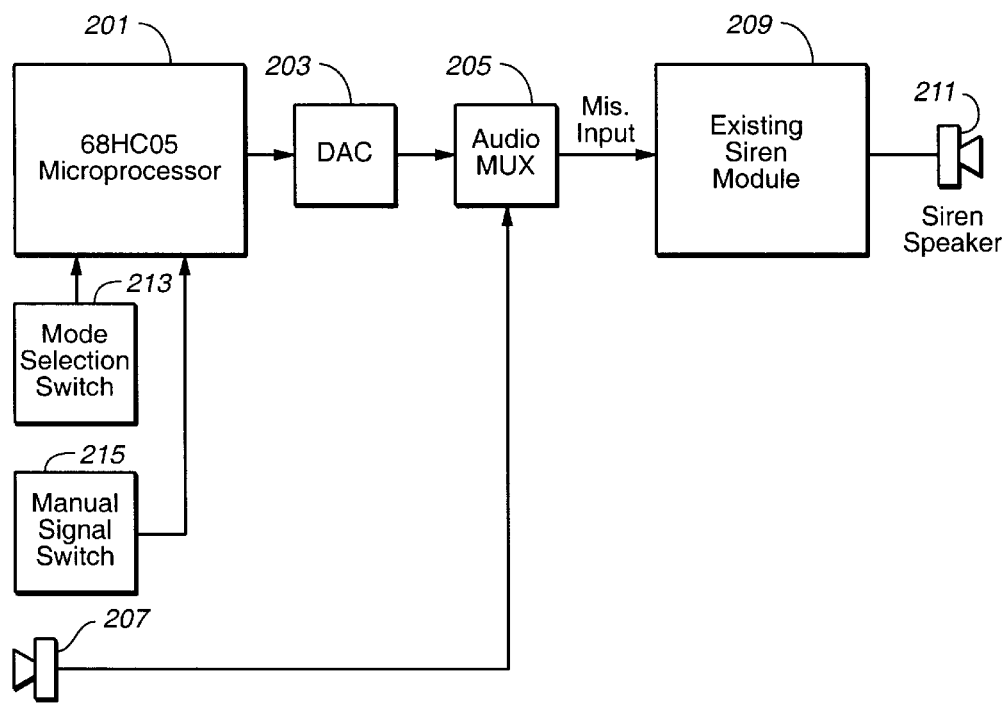
FIG._2
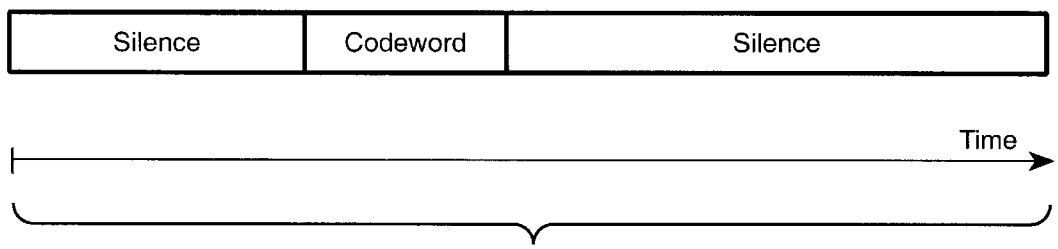
FIG._3

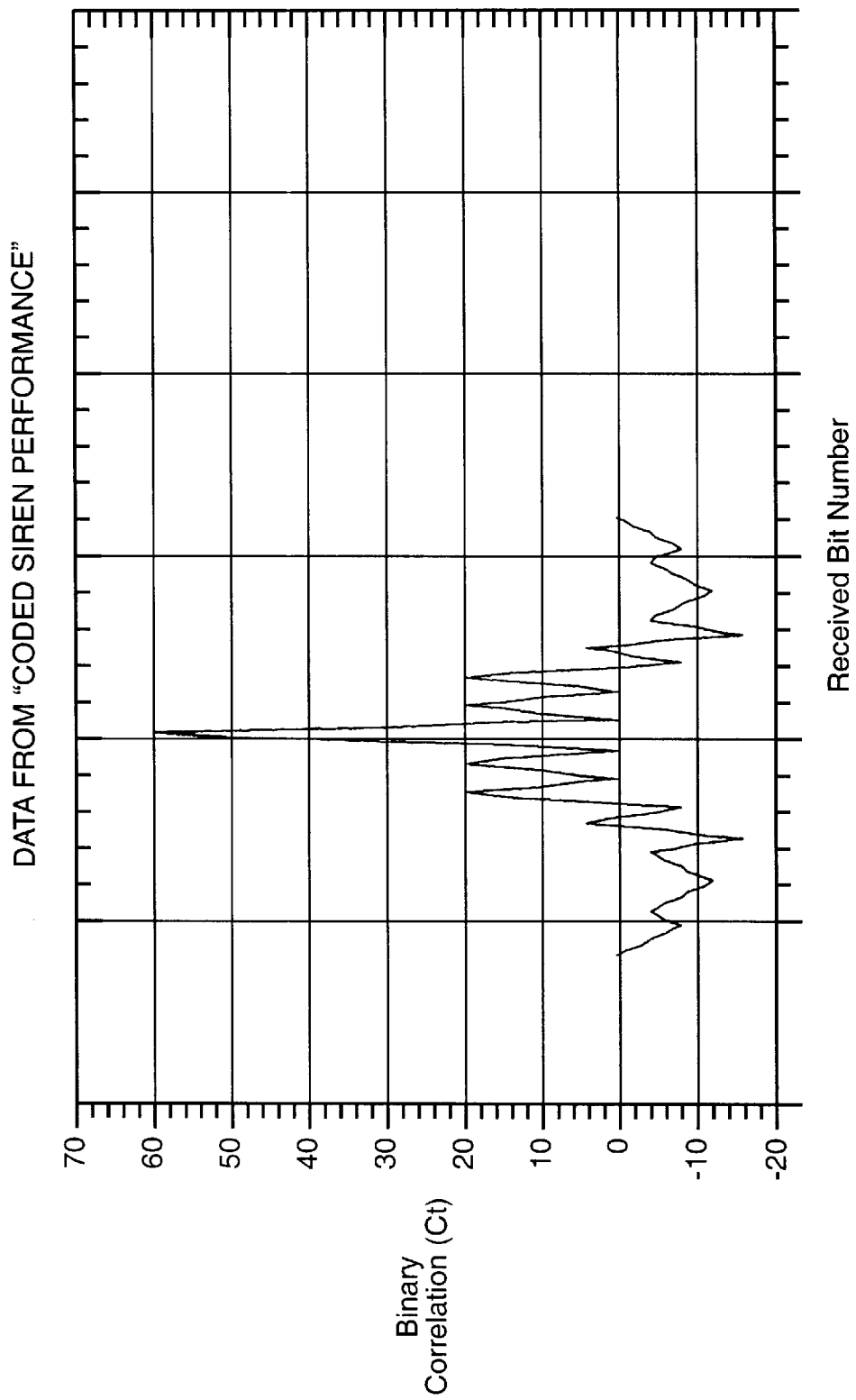
FIG._4

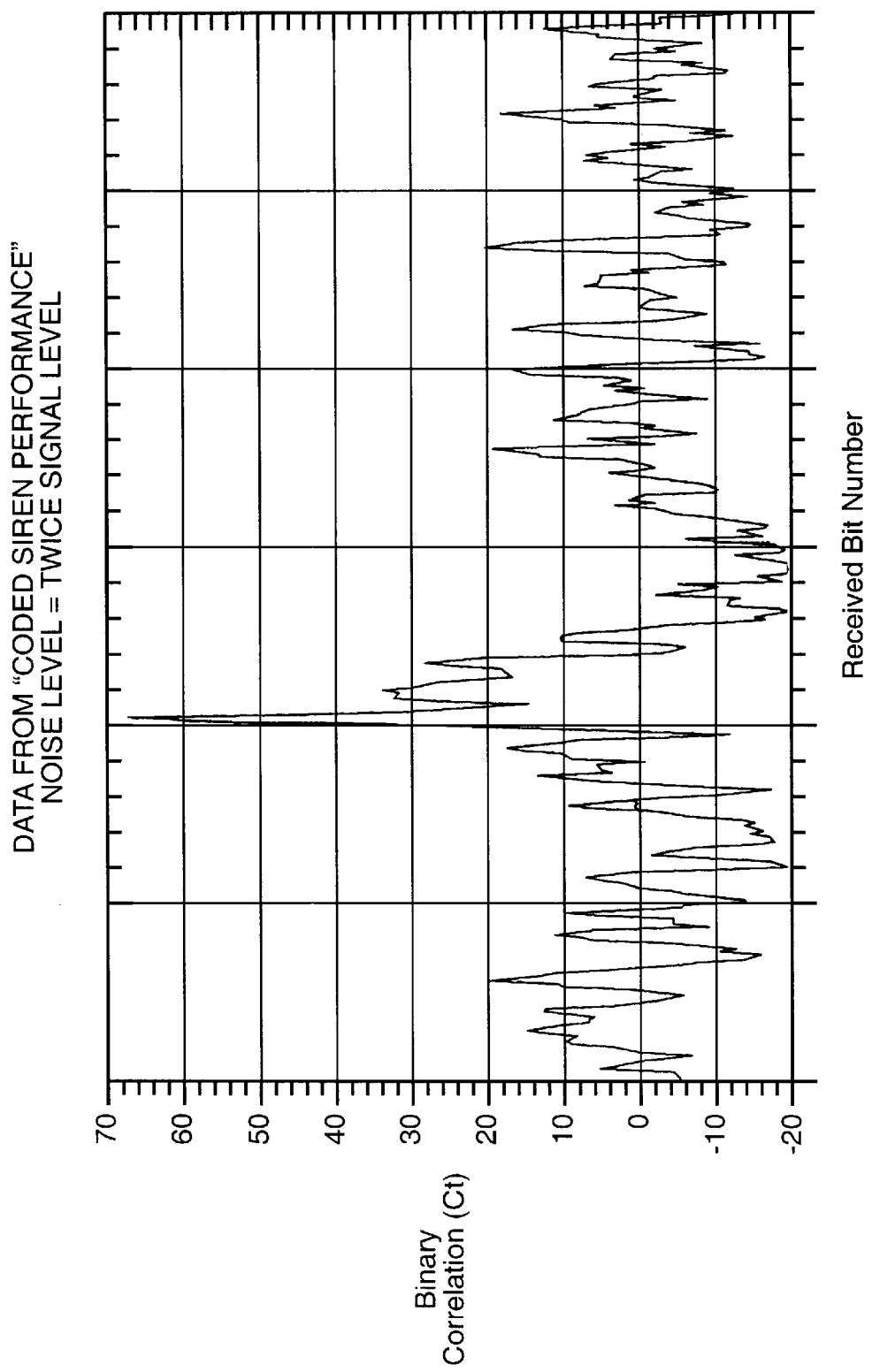
FIG._5

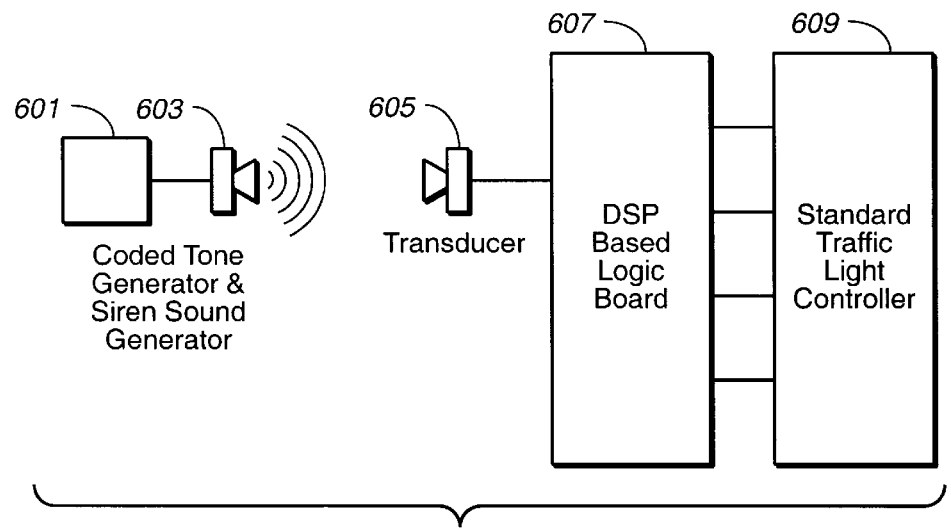
FIG._6
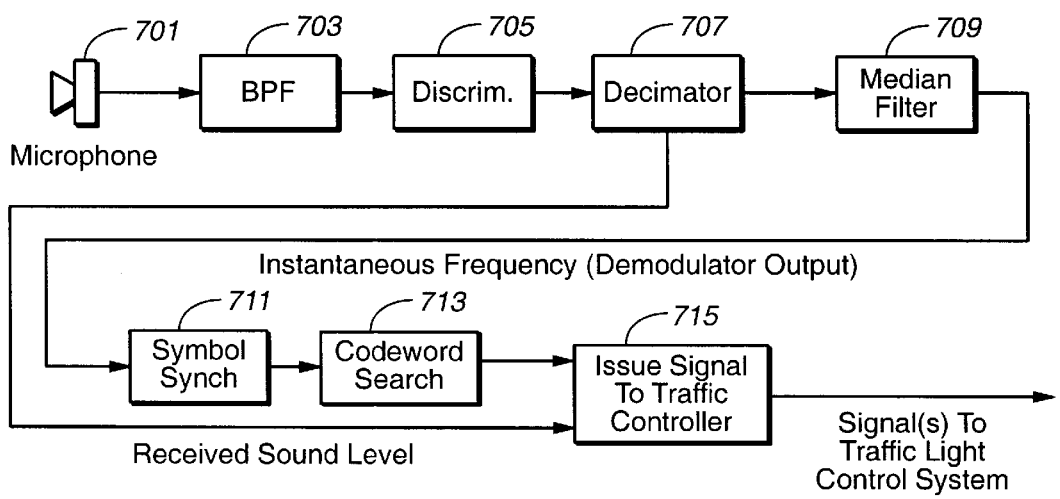
FIG._7

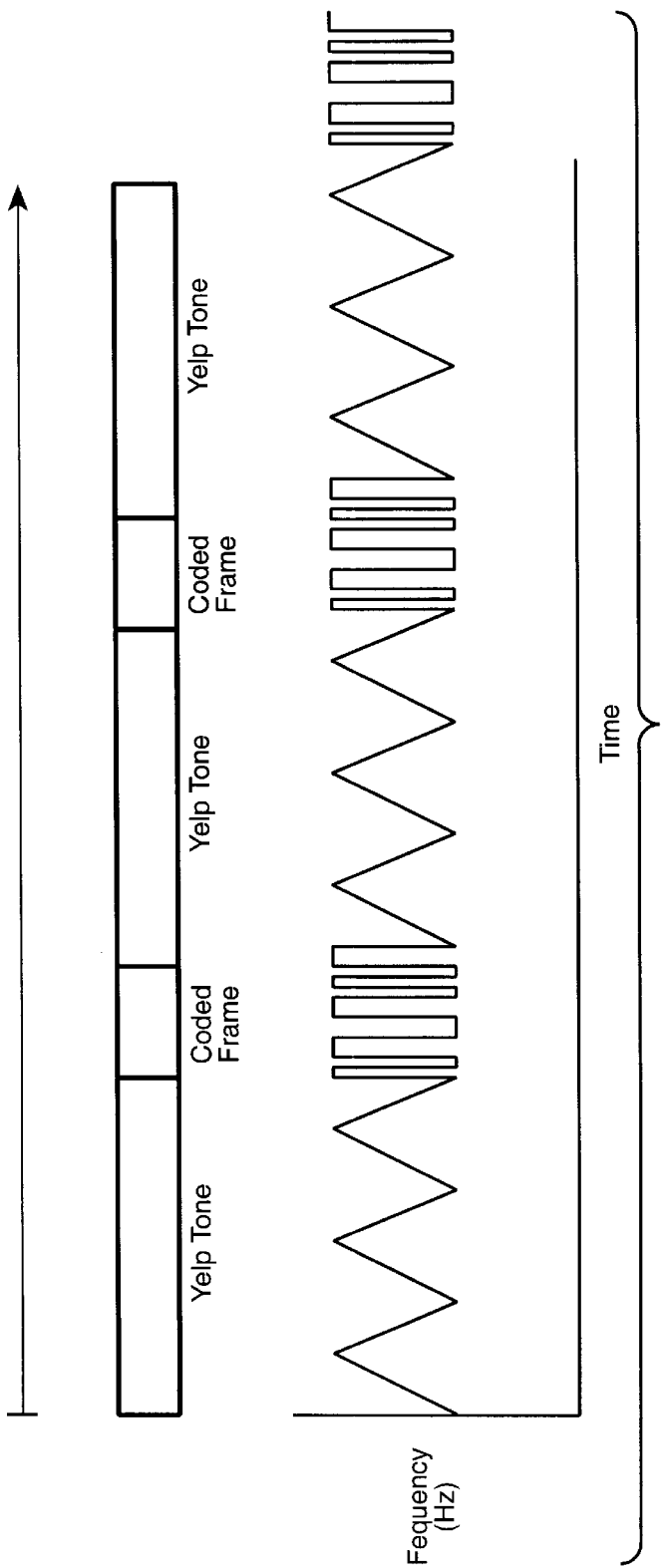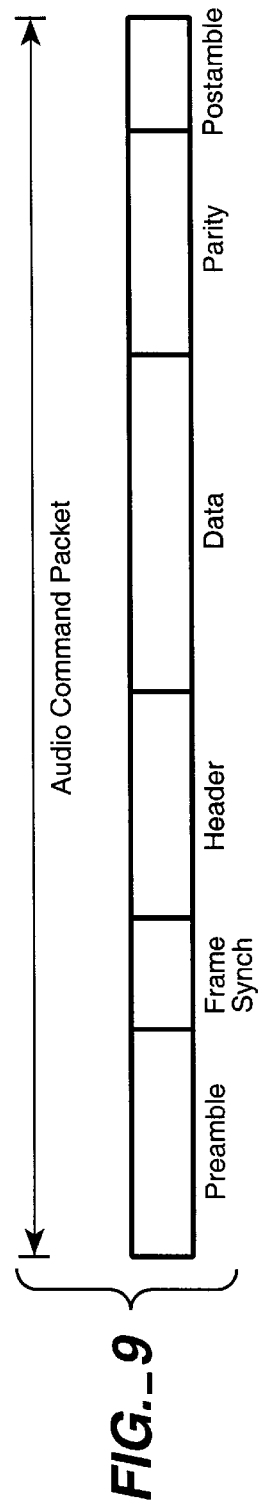

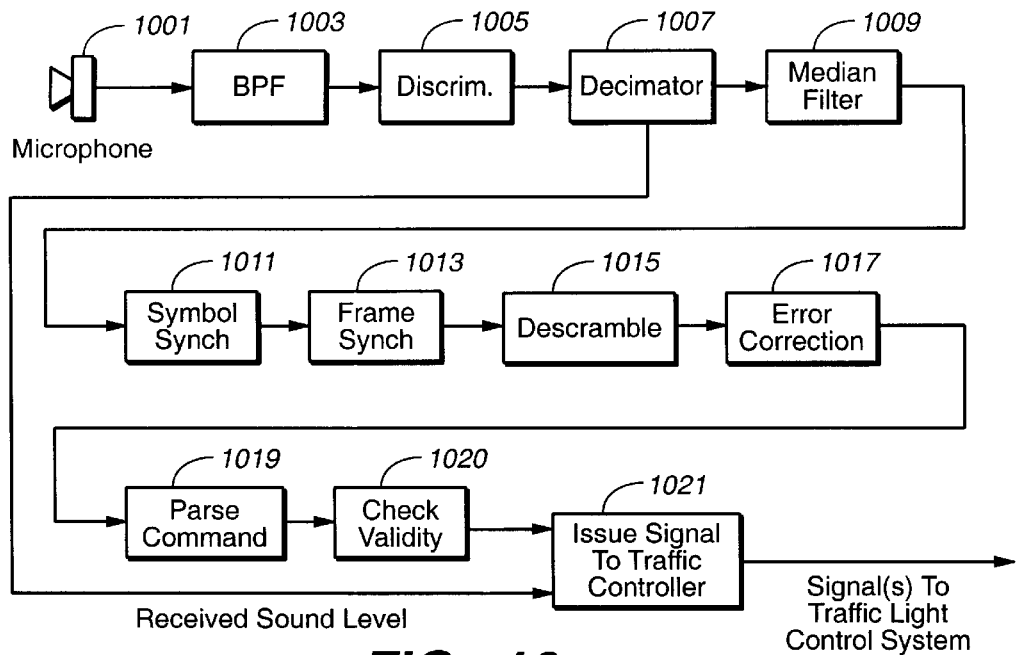
FIG._10
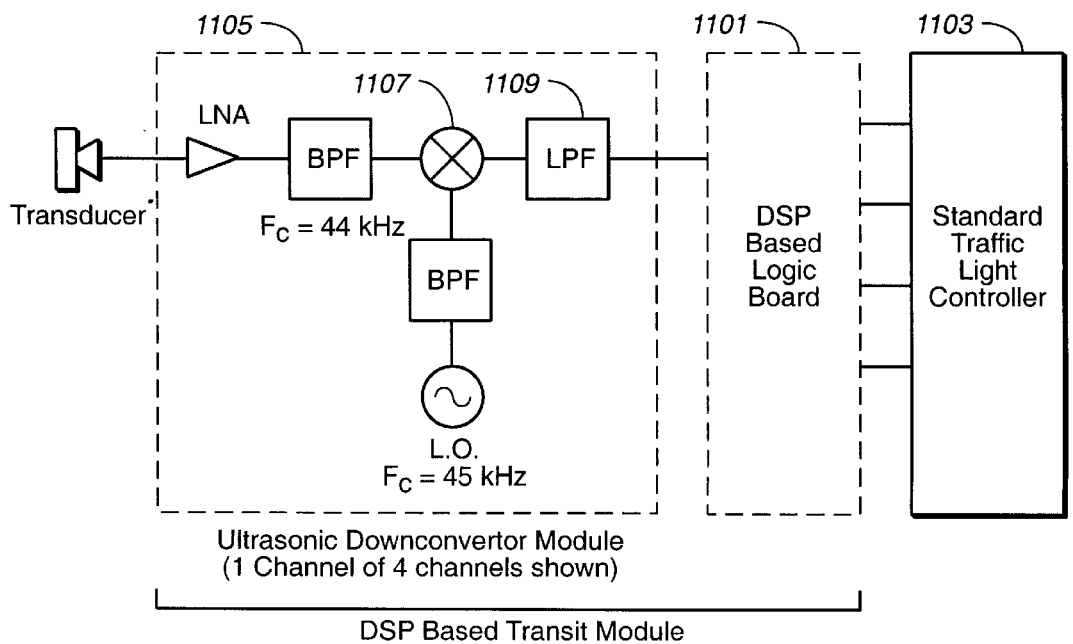
FIG._11

CONTROL SIGNAL CODING AND DETECTION IN THE AUDIBLE AND INAUDIBLE RANGES

BACKGROUND OF THE INVENTION

1. Field of the Invention

The present invention relates to siren sound generators and siren sound detectors, especially for traffic signal pre-emption.

2. State of the Art

Siren sound generators (siren generators) and siren sound detectors (siren detectors), including siren detectors for traffic light pre-emption, are known. A particularly effective siren detector arrangement is disclosed in U.S. Pat. No. 4,864,297 to Shaw et al., incorporated herein by reference, in which a filter tuned to a mean precession frequency produces precession signals which are in turn filtered by "wail" and "yelp" low-pass filters, respectively. A similar arrangement is described in WO 95/24028, (McConnell et al.) published Sep. 8, 1995, incorporated herein by reference. The siren detector architecture described in McConnell et al., however, is DSP-(digital signal processor) based and is influenced by RF (radio frequency) design, allowing a great improvement to be achieved in the ability to detect siren signals having low signal to noise (SNR) ratios. In particular, the siren detector of McConnell et al. has been demonstrated effective in detecting siren signals down to about −2 to −3dB SNR. The sound technology disclosed in McConnell is referred to herein by the term FM Discriminator Receiver and is employed in the SONEM 2000 Digital Siren Detector made by the present assignee, Sonic Systems Ltd. of Vancouver, B.C.

The present invention relates to further improvements in siren detectors of the type described, as well as to siren generators, allowing for siren detection systems of greater flexibility and versatility.

SUMMARY OF THE INVENTION

A coded siren sound generator and a corresponding detector module are provided which allow uniquely coded tone patterns generated by the coded siren to be detected and processed such that only specific sirens will activate the detector module. In one embodiment, only a few codewords are sent by the transmitter. The receiver looks for the occurrence of one or more of these selected codewords and takes a predetermined action based on programming of the detector. The system may operate at audible or ultrasonic frequencies. In accordance with a further embodiment, audio (either audible or ultrasonic) "packets" are sent by the transmitter. These packets contain sufficient information to uniquely identify the vehicle sending the packet and allow the vehicle to send commands and data to the detector. The commands and data may be for purposes such as requesting emergency pre-emption for a left turn at an intersection, requesting straight ahead pre-emption, etc.

BRIEF DESCRIPTION OF THE DRAWING

The present invention may be further understood from the following description in conjunction with the appended drawing. In the drawing:

FIG. 1 is a timing diagram of a Coded Audio Signal transmitted at fixed intervals;

FIG. 2 is a block diagram of a Coded Audio Sound Generator;

FIG. 3 shows an example of a codeword sent in stealth mode;

FIG. 4 is a plot of a correlation output for a codeword UW1 in no noise;

FIG. 5 is a plot of a correlation output for codeword UW1 in noise, with the noise level set at twice the signal level;

FIG. 6 is a block diagram of a Coded Siren Detector Module System;

FIG. 7 is an equivalent functional block diagram of a portion of the Coded Siren Detector Module of FIG. 6 realized by the DSP in accordance with a first embodiment of the invention;

FIG. 8 is a timing diagram of a Coded Audio Signal transmitted at fixed intervals;

FIG. 9 is a diagram of an Audio Command Packet;

FIG. 10 is an equivalent functional block diagram of a portion of the Coded Siren Detector Module realized by the DSP in accordance with a second embodiment of the invention; and FIG. 11 is a block diagram of an ultrasonic Transit Control Module in accordance with further embodiment of the invention.

DETAILED DESCRIPTION OF THE PREFERRED EMBODIMENTS

Three principal embodiments of a coded siren detector are described. The first embodiment provides the ability to add a unique detection capability to the siren. The second embodiment adds to the unique detection capability the further ability of the vehicle operator to have the siren detector take specific actions. In a third embodiment, an ultrasonic downconverter module is provided, allowing the coded siren detector to operate in the ultrasonic range.

In the first embodiment of the invention, a DSP Based Coded Siren Detector Module is based on the DSP Siren Detector Module described in McConnell et al., with the following exceptions. First, the vehicle which is to activate traffic light pre-emption is equipped with a special siren which issues "codewords" at fixed intervals, or on command of the driver. Between the transmission of these special codewords, the siren emits the familiar wail, yelp, or high-low siren sounds. As a special mode of operation, the siren may emit only the codewords, at fixed intervals or on command from the driver. A nearly silent mode of operation is thus provided in which the driver may activate the siren detector without drawing undue attention to the presence of the emergency vehicle. Second, the DSP Based Siren Detector receives the foregoing codewords, decodes the codeword to determine if it is one of a pre-determined set of codewords recognized as being valid, and then issues a pre-empt signal to a traffic controller if the codeword assigned to that vehicle is valid.

The Coded Siren Detector Module, or CSDM, is a two part system. The first part is an audio based transmitter system on each vehicle that is to control the traffic light system. Referring to FIG. 1, when the vehicle operator enables the siren, the unit emits the familiar wail, yelp, or high-low siren sounds. At specific time intervals, say 5 seconds, the transmitter stops sending the particular siren sound and instead sends a codeword using binary FSK modulation of the audio carrier. The familiar siren sounds (yelp, wail, and high-low) are still used in the present system, since they are universally recognized as being associated with emergency vehicles, enabling drivers to take appropriate action when the siren sound is heard.

Each vehicle is retrofitted with a Coded Sound Generator. The Coded Sound Generator may be a simple audio generator the output of which is input to a microphone input of the vehicle PA system, typically furnished as part of a conventional siren module. This Coded Sound Generator generates the standard siren sounds normally generated by the conventional siren module, and generates in addition the appropriate codeword.

Referring more particularly to FIG. 2, a programmed microprocessor 201 is coupled to a Digital To Analog Converter (DAC) 203. An output of the DAC 203 is coupled to an Audio MUX 205. Also coupled to the Audio MUX 205 is a PA microphone 207. An output of the Audio MUX 205 is coupled to the microphone input of an existing siren module 209, which is coupled to a siren speaker 211. A mode selection switch 213 and a manual signal switch 215 are also provided and are coupled to the microprocessor 201.

The microprocessor 201 reads the mode selection switch 213 to determine if the operator wants the siren activated, and if so which siren sound should be used (i.e. wail, yelp, high-low). The microprocessor 201 generates synthetic digital waveforms representing the desired siren, and also generates the codeword. These signals are converted to an analog voltage by the DAC 203 and then input to the Audio MUX 205, which selects either the siren or the PA microphone. This manner of operation allows the original siren/PA functionality of the existing siren module 209 to be maintained. The output of the MUX 205 is input to the microphone input of the existing siren module 209. The manual signal switch 215 allows the operator to generate codeword signals at desired intervals rather than at timed intervals. The operator may wish to enable the pre-empt when approaching a traffic light, for example.

The CSDM will only issue a pre-empt signal when a coded signal which meets specific conditions is detected. This feature allows for a greater degree of control of traffic light pre-emption. For example, a city having such a system deployed may only want emergency vehicles owned by that city to activate CSDM equipped traffic light controllers.

In the first embodiment of the present invention, the codewords used in the Coded Siren Detector Module are binary patterns of a specific length. The patterns are chosen such that they have desirable autocorrelation function characteristics—specifically low auto-correlation sidelobes. Furthermore, in choosing a family of codewords, attention should also be paid to the cross-correlation properties of the codewords. In particular, in addition to there being a low degree of correlation between the codewords, their cross-correlation functions should have low side-lobes. For example, the following seven codewords represent a family of code-words which satisfy the foregoing requirements:

UW1=110111010100000
UW2=101110110100000
UW3=101111001100000
UW4=110101101100000
UW5=101111010010000
UW6=111100101010000
UW7=101011101000100

The audio codeword may be transmitted using simple Frequency Shift Keying (FSK) modulation at some carrier frequency, where $f_c$ is the center frequency, $f_c+\delta f$ is the frequency for the transmission of a binary 1, and $f_c-\delta f$ is the frequency for the transmission of a binary 0. The codeword consists of a stream of binary digits sent using one of these two tones.

The CSDM receives the codeword using a microphone system and then demodulates the audio codeword. Demodulation is performed using an FSK demodulator. The CSDM first synchronizes to the incoming bit stream by performing a symbol timing recovery operation on the codeword. Once synchronized, the FSK CSDM searches for the codeword. The search may be done by binary correlation with threshold detection, using the stored reference codewords (UW1 to UW7) as a reference. If the codeword is received with more bits matching the stored reference pattern than the threshold value, it will be processed and the desired commands will be interpreted and issued to the traffic light controller. If the packet was received with an uncorrectable number of errors, the command will be rejected and no signals will be sent to the traffic light controller.

To test the performance of the detector in searching for the codeword, the 15-bit codeword UW1 was used an example. The stealth mode of operation was chosen in which no siren sounds were present, only a single codeword transmitted by the vehicle as shown in FIG. 3. The codeword was sent as a 15-bit sequence using the binary FSK modulation scheme discussed earlier, and was preceded and followed by silence. The signal was processed using a binary correlation algorithm, and the correlation output was plotted as a function of time as shown in FIG. 4. In this case, the maximum in the correlation is seen to occur at about sample 101, which marks the location of the codeword in time. The maximum of the correrlation value is 60, since the 15-bit codeword was sampled at 4 samples per bit. If a threshold value of, say, 56 was taken as a detection threshold, then only correlation outputs in excess of 56 would cause the microphone system to indicate the presence of the codeword.

The real performance advantage of binary correlation with threshold detection using the foregoing codewords is obtained under noisy conditions. Consider the same 15-bit codeword in a noisy environment where the noise level is twice the level of the codeword sound received from the vehicle. Referring to FIG. 5, it may be seen that the correlation peak is still quite prominent and distinct from any correlation peaks generated by the noise itself. In this example, the correlation peak near bit 100 is still very prominent and the peaks resulting from the correlation of the stored reference with the noise are still very small.

It is possible to use longer length codewords to achieve even better performance in a noisy environment. Longer codewords would also reduce the probability of false detection, i.e., the probability of the chance situation where received noise just happens to look like the stored reference signal and falsely causes the detection threshold of the binary correlator to be exceeded. The following table shows the probability of false detection and the probability of missed detection (the probability that the codeword was in fact transmitted, but that noise corrupted a sufficiently large number of bits that the binary correlator missed the codeword) for codeword lengths of 15, 20 and 32 bits, where the correlator threshold is set to tolerate two bit errors (a 1% bit error rate channel). It is readily seen that for the

TABLE I

Binary Correlation with Threshold Detection For Various Codeword Lengths

| Codeword Length (bits) | Bit Errors Tolerated | $P_{false}$ | $P_{missed}$ |
|---|---|---|---|
| 15 | 1 | $4.88 \times 10^{-4}$ | $9.63 \times 10^{-4}$ |
| 20 | 1 | $2.00 \times 10^{-5}$ | $1.69 \times 10^{-3}$ |

TABLE I-continued

Binary Correlation with Threshold Detection For Various Codeword Lengths

| Codeword Length (bits) | Bit Errors Tolerated | $P_{false}$ | $P_{missed}$ |
|---|---|---|---|
| 20 | 2 | $2.01 \times 10^{-4}$ | $1.00 \times 10^{-2}$ |
| 32 | 2 | $1.23 \times 10^{-7}$ | $3.99 \times 10^{-3}$ |
| 32 | 3 | $1.28 \times 10^{-6}$ | $2.87 \times 10^{-4}$ |

32-bit codeword case tolerating two errors, there will be very few cases of false detection. Assuming that events happen at the bit interval and that the bit rate is 20 bps, then there would be on average one false detection approximately every 4.7 days. This probability can be reduced even more by using the loudness of the received codeword to trigger a signal pre-emption event (i.e., the correlation output must exceed the threshold, and the sound level must exceed a sound level threshold, indicating that the vehicle is in proximity to the microphone).

In a preferred embodiment, the functionality of the CSDM as described is implemented using substantially the same hardware platform as the DSP Based Siren Detector of McConnell et al. Only the DSP software is changed. The Detection algorithm may be based on the limiter/discriminator approach of McConnell et al., but includes in addition a low rate demodulator to perform symbol timing recovery and codeword detection.

Referring more particularly to FIG. 6, a coded tone generator and siren sound generator 601 is coupled to a loudspeaker 603. At the receiver, the coded siren signal produced by the coded tone generator and siren sound generator 601 is picked up by a transducer 605 and input to a DSP-Based Logic Board 607. The DSP-Based Logic Board 607 processes the coded siren signal and outputs pre-empt signals to a standard traffic light controller 609 based on that processing.

The DSP-Based Logic Board 607 realizes a Siren Detector Module that uses the same limiter discriminator operations as described in McConnell et al. to perform FSK demodulation of the FSK signal. The software is modified to incorporate the following additional functions:

Symbol Timing Recovery—this may be based on a simple early/late-gate symbol synchronizer.

Codeword Search—this may be based on a binary correlation with threshold detection technique, using the pre-stored reference codewords as templates for the binary correlation.

In addition to these functions, the software is modified to include a command parser to determine which codeword was received and to then take appropriate action based on the command and data in the command packet.

An equivalent functional block diagram of the CSDM is shown in FIG. 7. An output signal from a microphone 701 is filtered in a band-pass filter 703. The filtered signal is then input to a combination of a Discriminator 705, a Decimator 707 and a Median Filter 709. An output of the Median Filter 709 is coupled to a symbol synchronization block 711, followed by a codeword search block 713. An output of the codeword search block is input to a block 715 to control whether a signal is issued to the traffic controller. Also input to the block 715 is the output of the Decimator 707, indicative of the received signal level.

As compared to the DSP based siren detector of McConnell et al., the Discriminator, Decimator, and Median Filter operations are the same, to ensure the highest sensitivity possible for the CSDM based on the excellent signal detection capability inherent in that technique. Signal detection is followed by the operations of blocks 711, 713 and 715, required to decode the codeword and then execute the command associated with that codeword.

The CSDM will typically be provided with a multiplicity of channels. A single channel is allocated to each street approaching an intersection. In the vast majority of cases, a four channel detector system will suffice. Cases with more than four streets per intersection may be dealt with by assigning additional channels.

In accordance with a second embodiment of the invention, the DSP Based Coded Siren Detector Module offers increased functionality, above and beyond that of the first embodiment. As in the first embodiment, the CSDM is based on the DSP Siren Detector module of McConnell et al., with the following exceptions. First, the vehicle which is to activate the traffic light pre-emption is equipped with a special siren which issues coded "frames" at fixed intervals or on command of the driver. Between the transmission of these special coded frames, the siren emits the familiar wail, yelp, or high-low siren sounds. As a special mode of operation, the siren may emit only the coded words at fixed intervals or on command from the driver. A nearly silent mode of operation is thus provided in which the driver may activate the siren detector without drawing undue attention to the presence of the emergency vehicle. Second, the DSP Based Siren Detector is modified to receive the coded frames, decode the frame content, and then issue a pre-empt signal if the unique address assigned to that vehicle matches one of a list of addresses that the siren detector recognizes as being valid.

As before, the Coded Siren Detector Module, or CSDM, is a two part system. The first part is an audio based transmitter system on each vehicle that is to control the traffic light system. Referring to FIG. 8, when the vehicle operator enables the siren, the unit emits the familiar wail, yelp, or high-low siren sounds. At specific time intervals, say 5 seconds, the transmitter stops sending the particular siren sound and instead sends a packet frame using binary FSK modulation of the audio carrier. The familiar siren sounds (yelp, wail, and high-low) are still used in this system, since they are universally recognized as being associated with emergency vehicles, enabling drivers to take appropriate action when the siren sound is heard.

Each vehicle is retrofitted with a Coded Sound Generator. The Coded Sound Generator may be a simple audio generator the output of which is input to microphone input of the vehicle PA system, typically furnished as part of a conventional siren module. This Coded Sound Generator generates the standard siren sounds normally generated by the conventional siren module, and generates in addition the appropriate codeword.

The physical hardware used to realized the Coded Sound Generator may be the same as previously described in relation to FIG. 2. Referring again to FIG. 2, the microprocessor reads the mode selection switch to determine if the operator wants the siren activated, and if so which siren sound should be used (i.e. wail, yelp, high-low). The microprocessor generates synthetic digital waveforms representing the desired siren, and also generates the packet frame (as opposed to a singular codeword as in the previous embodiment). These signals are converted to an analog voltage by the Digital to Analog Convertor (DAC) and then input to the Audio MUX, which selects either the siren or the PA microphone. This manner of operation allows the original siren/PA functionality of the existing siren module to be maintained. The output of the MUX is input to the microphone input of the existing siren module. A manual signal switch is also available to allow the operator to generate packet frame signals at desired intervals rather than at timed intervals. The operator may wish to enable the pre-empt when approaching a traffic light, for example.

The CSDM will only issue a pre-empt when a packet frame which meets specific conditions is detected. This feature allows for a greater degree of control of traffic light pre-emption. For example, a city having such a system deployed may only want emergency vehicles owned by that city to activate CSDM equipped traffic light controllers.

The audio command packet is structured in a fashion similar to a standard X.25 packet frame, described for example in Kuo, *Protocols and Techniques For Data Communications Networks,* Prentice Hall, 1981, incorporated herein by reference. Referring more particularly to FIG. 9, the audio command packet is transmitted using a simple Frequency Shift Keying (FSK) modulation at some carrier frequency, where $f_c$ is the center frequency, $f_c+\delta f$ is the frequency for the transmission of a binary 1, and $f_c-\delta f$ is the frequency for the transmission of a binary 0. The packet consists of a stream of binary digits sent using one of these two tones. The purpose of the various segments of the packet are as follows:

Preamble—to allow the CSDM to synchronize to the symbol centers of the binary data signal. The preamble is typically an alternating binary sequence, such as 1010101010.

Frame Synch—to provide word alignment to the control, data, and parity portions of the command packet. The frame synch is typically a short binary sequence such as a Barker code, Lindner Sequence, Maury-Styles Sequence, etc. One suitable frame synch word consists of the binary sequence 0010 0000 0111 0101.

Header—this field of the frame contains binary address information that is unique to each vehicle in the fleet, as well as a packet type identifier, and control flags. The actual binary sequence depends on the values given to the elements of the header field. In an exemplary embodiment, the field is 20 bits in length.

Data—this field may consist of anywhere from 0 bits to say 256 bits of information. In order to process the commands expeditiously, this field will typically be kept small in practice and may only consist of 8 bits of data.

Parity—parity information to be used for error correction and detection in the packet. If a CRC-16 is used, then 16 parity bits are required.

Postamble—a known sequence of data used to allow clearing of buffers in the receiver. The postamble would typically be a short sequence of alternating binary 1's and 0's, such as 101010.

As an added security measure, the header, data, and parity bits may be exclusive OR'ed with a known but secret pseudorandom Number (PRN) sequence to provide scrambling and a limited degree of security.

The CSDM module receives the packet using a microphone system and demodulates the audio packet command. Demodulation is performed using an FSK demodulator. The CSDM first synchronizes to the incoming bit stream by performing a symbol timing recovery operation on the packet, with the preamble being used to assist this synchronization. Once synchronized, the FSK CSDM searches for the frame synch word to achieve frame synchronization, after which it applies the PRN descrambling sequence, then extracts the command, data, and parity fields from the packet. It then uses the parity bits to perform error correction and/or detection on the control and data fields of the packet. If the packet is received without errors or with a correctable number of errors, it will be processed and the desired commands will be interpreted and issued to the traffic light controller. Examples of such commands are commands to permit pre-emptive passage directly through the intersection, permit a pre-emptive left turn, permit a pre-emptive right turn with no pedestrian traffic, etc. If the packet was received with an uncorrectable number of errors, the command will be rejected and no signals will be sent to the traffic light controller.

As in the previous embodiment, the functionality of the CSDM as described is implemented using substantially the same hardware platform as the DSP based siren detector of McConnell et al. (See FIG. 6.) Only the DSP software is changed. The Detection algorithm may be based on the limiter/discriminator approach of McConnell et al., but includes in addition a low rate demodulator to perform symbol timing recovery and synch word detection. The header and data fields are processed by the CPU for activation of transit preempts.

The Siren Detector module uses the same limiter discriminator operations as described in McConnell et al. to perform FSK demodulation of the FSK signal at the intermediate frequency (IF). The software is modified to incorporate the following additional functions:

Symbol Timing Recovery—this may be based on a simple early/late-gate symbol synchronizer.

Frame Synchronization—this may be based on a binary correlation with threshold detection technique.

Descrambling—this may be an Exclusive OR of the header, data, and parity fields with the known PRN sequence.

Frame Extraction—as per conventional practice.

Error Correction/Detection Coding—this may be based on any of a number of well established error correction coding schemes, such as Hamming codes, Golay codes, BCH, etc.

In addition to these functions, the software is modified to include a command parser to extract, interpret, and to then take appropriate action based on the command and data in the command packet.

An equivalent functional block diagram of the CSDM is shown in FIG. 10. An output signal from a microphone 1001 is filtered in a band-pass filter 1003. The filtered signal is then input to a combination of a Discriminator 1005, a Decimator 1007 and a Median Filter 1009. An output of the Median Filter 1009 is coupled to a symbol synchronization block 1011.

Thus far, the block diagram of the enhanced CSDM is identical to that of FIG. 7. The symbol synchronization block 10111, however, is followed by a frame synch block 1013 and an optional descrambler 1015. An output of the descrambler 1015 is input to an error correction block 1017. The error-corrected packet frame is then input to a command parser 1019. The command is input to a block 1020, where the validity of the command is checked. If the command is valid, a block 1021 is notified, which controls whether a signal is issued to the traffic controller. Also input to the block 1021 is the output of the Decimator 1007, indicative of the received signal level.

Again, as compared to the DSP Based Siren Detector of McConnell et al., the Discriminator, Decimator, and Median Filter operations are the same, to ensure the highest sensitivity possible for the CSDM based on the excellent signal detection capability inherent in that technique. Signal detection is followed by the operations required (blocks 1011 through 1021) to decode the packet frame, and then execute the command and associated data for that packet.

The foregoing description has assumed operation in the audible frequency range. However, both the CSDM of the first embodiment and the CSDM of the second embodiment may be based on ultrasonic sound energy operating above the threshold of human hearing (i.e.>20 kHz). Since the term "siren" is generally associated with an audible signal, the module used to perform detection of ultrasonic sonic traffic control signals is referred to herein as a Transit Control Module, or TCM. In a preferred embodiment, the TCM detects an digital packet which is binary FSK coded onto an ultrasonic audio carrier at approximately 44 kHz, although multilevel FSK (i.e. 4-level FSK) could also be used. The packet structure may be the same as that the CSDM of the second embodiment of the invention, described previously in relation to FIG. 9.

The reason for using ultrasonic audio frequencies is to reduce the nuisance value of the transit control signals issued by the transit vehicle. These frequencies are beyond the upper limit of the human hearing range, typically in excess of 20 kiloHertz. Although for purposes of the present description a frequency in the vicinity of 44 kHz is assumed, other ultrasonic frequency ranges could be used.

Referring to FIG. 11, the TCM, like the CSDM previously described, is implemented using a DSP/CPU Logic Board 1101. The DSP/CPU Logic Board issues control signals to a standard traffic light controller 1103. In the case of the TCM, however, the DSP/CPU Logic Board is preceded by a conventional audio down conversion board 1105 which converts the 44 kHz ultrasonic carrier to a nominal carrier frequency of 1 kHz. The ultrasonic carrier may be modulated by ±500 Hz to represent binary 1 or 0.

The downconvertor simply converts the carrier frequency, in this case 44 kHz, down to an intermediate frequency which is suitable for processing by the DSP based Siren Detector (300 Hz to 2500 Hz). In this case, the intermediate frequency is chosen to be 1 kHz. A Low Pass Filter (LPF) 1109 follows a mixer 1107 to ensure that the only the difference frequency is processed by the TCM.

As in the CSMD previously described, preferably the sound level of the ultrasonic sound is also used in determining if the received command is valid. This feature ensures that only vehicles in close proximity to the TCM can actually issue a command at a specific intersection and/or light.

The invention having been thus described, it will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of pre-emptively controlling a traffic signal, comprising the steps of:

producing an audible siren sound using a transducer;

using same said transducer, producing an acoustic coded signal including a regularly recurring digital codeword signifying a selected one of a plurality of traffic signal commands;

detecting the codeword and determining the traffic signal command; and controlling the traffic signal in accordance with the traffic signal command.

2. The method of claim 1, wherein the coded signal is audible.

3. The method of claim 1, wherein the coded signal is inaudible.

4. The method of claim 1, wherein the traffic signal command provides for one of the following: pre-emptive passage directly through an intersection, a pre-emptive left turn, and a pre-emptive right turn with no pedestrian traffic.

5. The method of claim 1, wherein the audible siren sound and the acoustic code signal are produced during a same mode of operation.

6. The method of claim 1, wherein the audible siren sound and the acoustic code signal are produced during different modes of operation.

7. A method of pre-emptively controlling a traffic signal, comprising the steps of:

producing an audible siren sound using a transducer;

using same said transducer, producing an acoustic coded signal including a regularly recurring digital codeword signifying a selected one of a plurality of traffic signal commands;

detecting the codeword;

determining whether the codeword is valid;

determining the traffic signal command; and if the codeword is valid, controlling the traffic signal in accordance with the traffic signal command.

8. The method of claim 7, wherein the coded signal is audible.

9. The method of claim 7, wherein the coded signal is inaudible.

10. The method of claim 7, wherein the traffic signal command provides for one of the following: pre-emptive passage directly through an intersection, a pre-emptive left turn, and a pre-emptive right turn with no pedestrian traffic.

* * * * *